United States Patent [19]
Ishikawa et al.

[11] Patent Number: 5,910,356
[45] Date of Patent: Jun. 8, 1999

[54] ADHERENT POLYESTER FILM LAMINATE

[75] Inventors: Toshifumi Ishikawa; Shinichiro Okada; Masayuki Fukuda; Hiroshi Tomita, all of Sagamihara, Japan

[73] Assignee: Teijin Limited, Osaka, Japan

[21] Appl. No.: 08/795,786

[22] Filed: Feb. 5, 1997

[30] Foreign Application Priority Data

| Feb. 8, 1996 | [JP] | Japan | ................................. 8-022419 |
| May 20, 1996 | [JP] | Japan | ................................. 8-124574 |
| May 27, 1996 | [JP] | Japan | ................................. 8-131732 |

[51] Int. Cl.$^6$ .......................... B32B 27/08; B32B 27/16; B32B 27/18; B32B 27/36
[52] U.S. Cl. .......................... 428/215; 428/323; 428/343; 428/480; 428/482; 313/461; 313/478; 313/479; 359/601
[58] Field of Search ................................. 428/343, 355 R, 428/480, 482, 910, 323, 215; 313/461, 478, 479; 359/601

[56] References Cited

U.S. PATENT DOCUMENTS

| 3,619,276 | 11/1971 | Shimeha et al. | .................. 117/138.8 F |
| 4,476,189 | 10/1984 | Posey et al. | .............................. 428/336 |
| 4,525,419 | 6/1985 | Posey et al. | .............................. 428/336 |
| 4,585,687 | 4/1986 | Posey et al. | .............................. 428/195 |
| 4,765,729 | 8/1988 | Taniguchi | .................................. 351/163 |
| 4,846,551 | 7/1989 | Rancourt et al. | ........................ 350/166 |
| 4,904,525 | 2/1990 | Taniguchi et al. | ....................... 428/328 |
| 4,910,090 | 3/1990 | Kuhlman et al. | ......................... 428/469 |
| 4,925,735 | 5/1990 | Koshizuka et al. | .................. 428/423.1 |
| 5,567,475 | 10/1996 | Hazen et al. | .............................. 427/221 |

FOREIGN PATENT DOCUMENTS

| 0 172 269 | 2/1986 | European Pat. Off. . |
| 0 323 599 A1 | 7/1989 | European Pat. Off. . |
| 0 543 308 A2 | 5/1993 | European Pat. Off. . |
| 1 460 218 | 12/1965 | France . |
| 3843723 A1 | 7/1989 | Germany . |
| 63045053 | 12/1986 | Japan . |
| 63-194948 | 2/1987 | Japan . |
| 7-156358 | 6/1995 | Japan . |
| 7156358 | 6/1995 | Japan . |

OTHER PUBLICATIONS

Abstract (XP–002058252), *Derwent Publications Ltd.*, Week 9150, Oct. 30, 1991.

Patent Abstracts of Japan (07156358), vol. 95, No. 9, Oct. 31, 1995.

*Primary Examiner*—Vivian Chen
*Attorney, Agent, or Firm*—Sughrue, Mion, Zinn Macpeak & Seas, PLLC

[57] ABSTRACT

An adherent polyester film laminate (A) having a coating layer of a composition formed on one side or both sides of a polyester film, the composition comprising, as main components, (i) an aqueous polyester having a secondary transition point of 40 to 85° C. and (ii) a fatty acid bisamide; a polyester film laminate (B) having a hard coat layer formed on the coating layer of the laminate (A); and a polyester film laminate (C) having an anti-reflection layer formed on the hard coat layer of the laminate (B). Since these laminates are excellent in adhesive force, transparency and slipperiness and has an anti-reflection property, they are useful as a face surface protective material for glass and displays.

14 Claims, No Drawings

ADHERENT POLYESTER FILM LAMINATE

BACKGROUND OF THE INVENTION

1. Field of the Invention

This invention relates to a polyester film laminate and, more specifically, to a polyester film laminate in which a coating layer of a specific composition is formed on at least one side of a polyester film to improve adhesion. This invention also relates to a polyester film laminate which is used as a surface protective material for glass plates.

2. Prior Art

Since polyester films, particularly biaxially oriented films of polyethylene terephthalate and polyethylene naphthalate, have excellent mechanical properties, heat resistance and chemical resistance, they are widely used as materials of magnetic tapes, ferromagnetic thin film tapes, photographic films, packaging films, films for electronic parts, electric insulating films, films to be laminated on metal plates, films for covering glass and displays, and protective films for various parts.

Generally speaking, these polyester films are rarely used alone and, in most cases, are used in a form of a laminate with a magnetic layer, photosensitive layer, protective layer, interlayer, colored layer, cured film layer, and further in a form of a coat on a metal or glass surface.

Therefore, the polyester films are required to have excellent adhesion not only to other layers but also to metals and glass.

DESCRIPTION OF RELATED ART

As means for improving the adhesion of such polyester films, there is known, for example, a method in which the adhesion of a polyester base film to a medium layer is improved by forming a coating layer of an aqueous polyester having a secondary transition point of 40 to 85° C. on the surface of the polyester base film for an in-mold transfer film [JP-A 7-156358 (the term "JP-A" as used herein means an "unexamined published Japanese patent application").

However, although the adhesion of the base film to the medium layer in the in-mold transfer film is improved by this method, improvement of the adhesion of the film can not be achieved to a satisfactory level in the cases of other applications in many cases.

Meanwhile, there is also known a method in which a coating layer of a composition comprising (A) polyurethane, (B) an acrylic resin and (C) a fatty acid amide or bisamide is formed on the surface of a polyester film to obtain a flat and slippery polyester film (JP-A 63-194948). In this composition, (C) the fatty acid amide or bisamide is blended to improve the flatness and slipperiness of the polyester film.

Further, there is known a method in which a laminate which is satisfactory in terms of surface hardness and abrasion resistance is obtained by forming a polyester resin layer on a polyethylene terephthalate layer and further, a radiation curable layer having a specific composition on the polyester resin layer (JP-A 7-80281). Since a special curable layer is used, the method lacks general applicability and yet is unsatisfactory in terms of adhesion.

SUMMARY OF THE INVENTION

It is a first object of the present invention to provide a polyester film laminate having improved adhesion, which is used to be adhered not only to another layer but also to the surface of a metal or glass, making use of the excellent physical properties and chemical properties of a polyester film itself.

It is a second object of the present invention to provide a polyester film laminate which has improved adhesion and is excellent in transparency and slipperiness.

It is a third object of the present invention to provide a polyester film laminate which is advantageously used as a surface protective material for glass plates such as windowpanes, showcases, spectacles, measurement instruments, displays and lamps, for example.

It is another object of the present invention to provide a polyester film laminate which has improved adhesion and excellent surface hardness and abrasion resistance and is satisfactory in terms of transparency and anti-refection property.

It is a further object of the present invention to provide a polyester film laminate which is excellent in adhesion, transparency, surface hardness, abrasion resistance and anti-reflection property as a face surface protective material for CRT.

According to studies conducted by the inventors of the present invention, the above objects of the present invention can be attained by an adherent polyester film laminate [A] having a coating layer of a composition formed on one side or both sides of a polyester film, the composition comprising, as main components, (i) an aqueous polyester having a secondary transition point of 40 to 85° C. and (ii) a fatty acid amide and/or a fatty acid bisamide.

Further, according to studies conducted by the inventors, the above objects of the present invention can be attained by a polyester film laminate (B) having a hard coat layer which is formed on the surface of the coating layer of the polyester film laminate (A) and a polyester film laminate (C) having a hard coat layer and an anti-reflection layer which are further formed on the surface of the coating layer of the polyester film laminate (A) in the order named.

DESCRIPTION OF PREFERRED EMBODIMENTS

The polyester film laminates (A), (B) and (C) of the present invention are described in detail hereinbelow.

(1) Polyester film laminate (A)

The polyester film laminate (A) of the present invention has a coating layer of a composition formed on one side or both sides of a polyester film, the composition comprises, as main components,(i) an aqueous polyester having a secondary transition point of 40 to 85° C. and (ii) an fatty acid amide and/or a fatty acid bisamide, and the surface of this coating layer has excellent adhesion. Therefore, this polyester film laminate (A) can be easily and firmly adhered to another layer, a metal or glass via the surface of this coating layer.

According to the present invention, as one form of this polyester film laminate (A), there is provided a polyester film laminate (may be referred to as "laminate (A-1)" hereinafter) having a haze value of not more than 1.5% and a friction coefficient ($\mu s$) of not more than 0.8, in which a coating layer of a composition comprising, as main components,(i) an aqueous polyester having a secondary transition point of 40 to 85° C. and (ii) a fatty acid amide and/or a fatty acid bisamide is formed on one side or both sides of a polyester film. This laminate (A-1) is superior to the polyester film laminate (A) in transparency and abrasion resistance and is suitable for use as a face surface protective material for CRT.

In the present invention, the polyester constituting the polyester film is a linear saturated polyester synthesized from an aromatic dibasic acid or an ester forming derivative thereof and a diol or an ester forming derivative thereof. Illustrative examples of the linear saturated polyester include polyethylene terephthalate, polyethylene isophthalate, polybutylene terephthalate, poly(1,4-cyclohexylenedimethylene-terephthalate), polyethylene-2,6-naphthalene dicarboxylate and the like. These polyesters may be copolymers and may further contain other thermoplastic resin(s) in a small amount, e.g., not more than 10% by weight. Preferred polyesters are polyethylene terephthalate and polyethylene-2,6-naphthalene dicarboxylate. These polyesters may contain an appropriate filler as required.

As the filler may be used known agents for providing slipperiness to a polyester film, as exemplified by calcium carbonate, calcium oxide, aluminum oxide, kaolin, silicon oxide, zinc oxide, carbon black, silicon carbide, tin oxide, crosslinked acrylic resin particles, crosslinked polystyrene resin particles, melamine resin particles, crosslinked silicone resin particles and the like. Further, the polyester may contain a colorant, antistatic agent, antioxidant, lubricant, catalyst and the like in suitable amounts.

The polyester film can be obtained by melt-extruding the polyester into a film in accordance with a usually employed method, and subjecting the film to orientation and heat treatment as required.

The polyester film is preferably subjected to crystal orientation until it exhibits a crystal fusion heat of not less than 4 cal/g, measured by a scanning calorimeter in a nitrogen gas current at a temperature elevation rate of 10° C./min.

The polyester film of the present invention includes an unstretched film obtained by melting the polymer under heating, and forming it into a film; a monoaxially stretched film obtained by stretching an unstretched film in one of longitudinal and transverse directions; a biaxially oriented film obtained by stretching an unstretched film in both longitudinal and transverse directions at low stretch ratios (a biaxially oriented film before completion of orientation by re-stretching in the longitudinal or transverse direction finally), or the like.

The thickness of the polyester film is 25 to 200 μm, preferably 35 to 200 μm.

In the adherent polyester film laminate (A) of the present invention, a coating layer of a composition comprising, as main components, (i) an aqueous polyester and (ii) a fatty acid amide and/or a fatty acid bisamide is formed on at least one side of the polyester film.

The aqueous polyester which is one of the components forming the coating layer has a secondary transition point (Tg) of 40 to 85° C., preferably 45 to 80° C. When the secondary transition point (Tg) of the aqueous polyester is below 40° C., disadvantageously, the obtained film will have low heat resistance and low blocking resistance, while when it is above 85° C., undesirably, the adhesion will deteriorate.

The aqueous polyester is a water-soluble or water-dispersible polyester. The aqueous polyester is a polyester produced from a polycarboxylic acid component such as terephthalic acid, isophthalic acid, phthalic acid, 2,6-naphthalenedicarboxylic acid, hexahydroterephthalic acid, 4,4'-diphenyldicarboxylic acid, phenylindanedicarboxylic acid, adipic acid, sebacic acid, 5-Na sulfoisophthalic acid, trimellitic acid, dimethylolpropionic acid or the like and a polyhydroxy compound component such as ethylene glycol, diethylene glycol, neopentyl glycol, 1,4-butanediol, 1,6-hexanediol, 1,4-cyclohexanedimethanol, glycerine, trimethylolpropane, addition product of bisphenol A with alkylene oxide or the like.

In case the aqueous polyester is required to have affinity, a polyether component or a component containing a SO$_3$Na group or COONa group may be introduced into the polyester.

The aqueous polyester is preferably used in an amount of 55 to 93% by weight, particularly preferably 60 to 90% by weight, based on the total weight of the coating layer. When the proportion of the aqueous polyester is below the above range, the adhesion will be insufficient, while when it is above the range, the blocking resistance will deteriorate.

In the polyester film laminate (A) of the present invention, the composition forming the coating layer comprises (i) the above-described aqueous polyester and (ii) a fatty acid amide and/or a fatty acid bisamide. The fatty acid amide and the fatty acid bisamide (ii) are preferably compounds represented by the following general formulae.

wherein $R^1$ and $R^2$ are independently a monovalent aliphatic group having 6 to 22 carbon atoms, preferably 8 to 20 carbon atoms, and $R^3$ is divalent aliphatic group having 1 to 15 carbon atoms, preferably 1 to 2 carbon atoms.

Illustrative examples of the fatty acid amide and fatty acid bisamide include N,N'-methylenebisstearic acid amide, N,N'-ethylenebispalmitic acid amide, N,N'-methylenebislauric acid amide, linolic acid amide, caprilic acid amide, stearic acid amide and the like.

Of these, preferred are fatty acid bisamides, more preferred are fatty acid bisamides having a molecular weight of 200 to 800, and the most preferred are fatty acid bisamides in which $R^3$ is an aliphatic group having 1 to 2 carbon atoms in the above general formula.

The fatty acid amide and/or the fatty acid bisamide are/is preferably contained in the composition forming the coating layer in an amount of 2 to 10% by weight, particularly preferably 3 to 8% by weight. When the content of the fatty acid amide and/or the fatty acid bisamide is too small, sufficient adhesive force cannot be obtained and slipperiness and blocking resistance are liable to deteriorate. When the content is too large, the adhesion between the film and the coating film will decrease, the coating layer will become brittle, and the haze value will increase.

In the present invention, the composition constituting the coating layer formed on the surface of the polyester film preferably contains surface roughening fine particles having an average particle diameter of not more than 0.15 μm, particularly preferably 0.01 to 0.1 μm.

Illustrative examples of such fine particles include inorganic fine particles such as calcium carbonate, magnesium carbonate, calcium oxide, zinc oxide, magnesium oxide, silicon oxide, sodium silicate, aluminum hydroxide, iron oxide, zirconium oxide, barium sulfate, titanium oxide, tin oxide, antimony trioxide, carbon black, molybdenum disulfide and the like; and organic fine particles such as crosslinked acrylic polymers, crosslinked styrene polymers, crosslinked silicone resins, fluororesins, benzoguanamine resins, phenol resins, nylon resins, polyethylene wax and the like. Of these, in the case where the fine particles are a water-insoluble solid substance, it is preferred to use ultrafine particles having a specific gravity of not more than 3 to prevent the particles from precipitating in a water dispersion.

It is desirable to blend these fine particles to the composition because they have functions to roughen the surface of the coating layer and at the same time to reinforce the coating layer and further provide blocking resistance to the coating layer.

To blend the fine particles into the coating layer, their proportion is advantageously 5 to 30% by weight. This range varies to some extent depending on the average particle size of the fine particles. In other words, when relatively large particles having an average particle diameter of not less than 0.1 μm are used, the proportion is preferably 5 to 10% by weight. If the proportion is below 5% by weight, blocking resistance and slipperiness will deteriorate, while if it is above 10% by weight, the haze value will increase. When particles having an average particle diameter of 0.01 to 0.1 μm are used, the proportion is preferably 5 to 30% by weight, more preferably 5 to 25% by weight. In this case, if the proportion is below 5% by weight, blocking resistance and slipperiness will deteriorate, while if it is above 30% by weight, the haze value will increase.

The above composition in the present invention is used in the form of an aqueous solution, aqueous dispersion or emulsion to form the coating layer. To form the coating layer, the composition may further contain other resin(s), antistatic agent, colorant, surfactant, ultraviolet absorber and the like as required, in addition to the above aqueous polyester.

Although the application of the coating solution to the polyester film may be carried out in any desired stage, it is preferably carried out in the stage of forming the polyester film, more preferably before the crystal orientation of the polyester film is completed.

The polyester film before the completion of crystal orientation includes, as described above, an unstretched film, a monoaxially stretched film obtained by stretching an unstretched film in one of longitudinal and transverse directions, or a biaxially oriented film obtained by stretching an unstretched film in both longitudinal and transverse directions at low stretch ratios (biaxially oriented film before crystal orientation is completed by re-stretching the biaxially oriented film in the longitudinal or transverse direction finally).

It is particularly preferred that the coating solution of the above composition be applied to an unstretched film or a monoaxially stretched film which has been stretched monoaxially and the coated film should be then stretched in the longitudinal direction and/or transverse direction(s) and heat set.

Prior to the application of the coating solution to the film, the surface of the film is subjected to a physical treatment such as a corona surface treatment, flame treatment or plasma treatment as a pretreatment for improving applicability, or the coating composition is preferably used in combination of a surfactant which is chemically unreactive with the coating composition. This surfactant is intended to promote the wetting of the polyester film with the aqueous coating solution, and is selected from anionic and nonionic surfactants such as polyoxyethylene alkylphenyl ether, polyoxyethylene-fatty acid ester, sorbitan fatty acid ester, glycerine fatty acid ester, fatty acid metal soap, alkyl sulfate, alkyl sulfonate, alkyl sulfosuccinate and the like.

It is desired to use the surfactant in a proportion of 0 to 10% by weight, preferably 0 to 8% by weight based on the composition forming the coating layer. When the base polyester film is subjected to a surface treatment (such as a corona treatment), it is not necessary to use the surfactant. The amount of the coating solution applied is preferably such that the thickness of the coating layer should be 0.02 to 0.3 μm, preferably 0.07 to 0.25 μm. If the thickness of the coating film is too small, adhesive force will be insufficient, while if the thickness is too large, it is likely that blocking will occur or the haze value will increase.

Any known application methods can be applied such as roll coating, gravure coating, roll brushing, spray coating, air knife coating, impregnation, curtain coating and the like, which may be used alone or in combination.

The coating layer may be formed on only one side of the film or both sides of the film as required.

Thus, according to the present invention, there can be obtained a polyester film laminate (A) having improved adhesion. Of the polyester film laminates of the invention, the laminate (A-1) having a haze value of not more than 1.5% and a friction coefficient (μs) of not more than 0.8 exhibits high transparency and excellent slipperiness and is, therefore, particularly suitable for use as a face surface protective material for glass and CRT.

This laminate (A-1) preferably has a haze value of not more than 1.0%, particularly preferably not more than 0.5%. Further, the laminate (A-1) particularly preferably has a friction coefficient (μs) of not more than 0.5. To set the friction coefficient (μs) to a value smaller than 0.8, preferably smaller than 0.5, it is advisable to adjust the center line average roughness (Ra) of the surface of the coating layer to the range of 0.002 to 0.01 μm. The laminate having the center line average roughness (Ra) of the surface of the coating layer within the above range can be obtained by adding the above-described fine particles having an average particle diameter of not more than 0.15 μm, preferably 0.01 to 0.1 μm, in an amount of 5 to 30% by weight.

(b) Polyester film laminate (B)

According to the present invention, there is provided a polyester film laminate (B) having a hard coat layer further formed on the coating layer of the polyester film laminate (A). When a coating layer is formed on one side of the polyester film in the laminate (A), the laminate (B) has a polyester film/coating layer/hard coat layer structure.

On the other hand, when a coating layer is formed on both sides of the polyester film in the laminate (A), the laminate (B) has a coating layer/polyester film/coating layer/hard coat layer structure or a hard coat layer/coating layer/polyester film/coating layer/hard coat layer structure. The former structure is of more practical use.

The hard coat layer in the polyester film laminate (B) of the present invention may be a commonly used hard coat layer of a silane resin or a radiation cured resin, for example. A hard coat layer of a radiation cured resin is preferred and a hard coat layer of a UV cured resin is particularly preferred.

Illustrative examples of the UV cured resin composition used for forming the hard coat layer include urethane-acrylate resins, epoxy-acrylate resins, polyester-acrylate resins and the like.

To form the hard coat layer on the coating layer of the adherent polyester film laminate (A), a resin composition is coated on the coating film and cured by heating, application of radiation (such as ultraviolet light) or the like.

The thickness of the hard coat layer is generally 3 to 30 μm, preferably 5 to 25 μm.

(c) Polyester film laminate (C)

According to the present invention, there is further provided a polyester film laminate (C) having the above-described hard coat layer and an anti-reflection layer formed on the coating layer of the polyester film laminate (A) in the order named. In other words, this polyester film laminate (C) has a structure that the anti-reflection layer is formed on the surface of the hard coat layer of the polyester film laminate (B).

This anti-reflection layer is used to prevent light reflection in a CRT or a liquid crystal display (LCD). That is, when this laminate (C) is placed on the face surface of a CRT or a liquid crystal display, the anti-reflection layer of the laminate has a function to prevent sunlight or light from a fluorescent lamp from being reflected on the display and improve the visibility of an image on the screen. The layer consists of several dielectric thin film layers having different refractive indices.

In other words, the anti-reflection layer is a laminate of several thin layers having different refractive indices and its structure itself is generally well known. Components which can be used in the low-refractive index layer of the anti-reflection layer include known substances such as silicon or transparent insulating metal oxides, e.g., aluminum. The transparent metal oxide layers can be formed by known means such as ion beam sputtering, vacuum deposition, ion plating, plasma CVD or the like. Of these, silicon oxide is particularly preferred from viewpoint of transparency, surface flatness, flexing properties, film stress and costs of the layer.

Components which can be used in the high-refractive index layer include known metals such as tin, titanium, indium and zinc and oxides thereof, and ITO (Indium-Tin-Oxide). The high-refractive index layer can be formed by known means such as sputtering, ion beam sputtering, vacuum deposition, ion plating or the like. Of these, ITO comprising indium oxide and 5 to 15% by weight of tin and is preferred from viewpoint of transparency and flexibility of the layer. For example, there are known a laminate structure consisting of a low-refractive index layer ($SiO_2$, 30 nm), a high-refractive index layer ($TiO_2$, 30 nm), a low-refractive index layer ($SiO_2$, 30 nm), a high-refractive index layer ($TiO_2$, 100 nm) and a low refractive index layer ($SiO_2$, 100 nm); a laminate structure consisting of a high-refractive index layer (ITO, 20 nm), a low-refractive index layer (AlSi, 20 nm), a high-refractive index layer (ITO, 88 nm) and a low-refractive index layer (AlSiO, 88 nm); and a laminate structure consisting of a high-refractive index conductive layer (ITO, 20 nm), a low-refractive index layer ($SiO_2$, 20 nm), a high-refractive index conductive layer (ITO, 93 nm) and a low-refractive index layer ($SiO_2$, 93 nm). However, the present invention is not limited to these.

In the present invention, the anti-reflection layer can be formed on the surface of the hard coat layer by sputtering or the like. In the polyester film laminate (C) of the present invention, the anti-reflection layer is generally formed on only one side.

The thickness of the anti-reflection layer is generally 0.05 to 0.5 $\mu$m, preferably 0.1 to 0.4 $\mu$m.

The polyester film laminate (C) of the present invention has the anti-reflection layer and is excellent in transparency with a haze value of not more than 1%. Therefore, the laminate (C) is extremely useful as an anti-reflection material for a CRT or a liquid crystal display, i.e., a face surface protective material for a CRT or a liquid crystal display.

The following examples are given to further illustrate the present invention. The adhesive force, blocking resistance, haze value, friction coefficient, center line average roughness, abrasion resistance and reflectance are evaluated in accordance with methods described below in the following examples and comparative examples.

(1) Adhesive force

A 5 $\mu$m-thick protective layer (hard coat layer) of an UV curable coating composition comprising 45% by weight of pentaerythritol triacrylate, 40% by weight of N-methylol acrylamide, 10% by weight of N-vinylpyrrolidone and 5% by weight of 1-hydroxycyclohexylphenyl ketone is formed on the coating layer surface of an adherent polyester film. This layer is cross cut to have one hundred 1 $mm^2$-squares, and cellophane tape is affixed to the squares and removed quickly at a peel angle of 180°. Then the separated surface is observed and evaluated based on the following criteria.

1: The separated area is more than 40% of the total area of the hard coat layer.
2: The separated area is 30% or more but less than 40%.
3: The separated area is 20% or more but less than 30%.
4: The separated area is 10% or more but less than 20%.
5: The separated area is less than 10%.

(2) blocking resistance

Two films are laminated together in such a manner that the coating film formed surface is in contact with the surface having no coating film thereon, and a pressure of 6 $kg/cm^2$ is applied onto the resulting laminate for 17 hours in an atmosphere of 60° C.×80% RH. Thereafter, the two films are peeled off from each other, and peel force at this time of peeling is evaluated based on the following criteria.

◎: less than 10 g/5 cm width
○: 10 g/5 cm width or more but less than 15 g/5 cm width
Δ: 15 g/5 cm width or more but less than 20 g/5 cm width
×: 20 g/5 cm width or more (3) haze value Using the NDH-20 haze meter of Nippon Denshoku Kogyo Co., Ltd., the haze value of the film is measured. The haze of the film is evaluated based on the following criteria.

◎: haze value ≤ 0.5% (haze of the film is excellent)
○: 0.5% < haze value ≤ 1.0% (haze of the film is good)
×: 1.0% < haze value (haze of the film is bad)

(4) friction coefficient ($\mu s$)

In accordance with ASTM D1894-63, the friction coefficient ($\mu s$) between the coating film formed surface and the polyethylene terephthalate film whose surface having no coating film thereon is measured using the slippery measuring apparatus of Toyo Tester Co. Ltd. In this case, a glass plate is used as a threaded plate and the load is 1 kg. The slipperiness of the film is evaluated based on the following criteria.

◎: friction coefficient ($\mu s$) ≤ 0.5 (slipperiness is excellent)
○: 0.5 < friction coefficient ($\mu s$) ≤ 0.8 (slipperi-ness is good)
×: 0.8 < friction coefficient ($\mu s$) (slipperiness is bad)

(5) center line average surface roughness (Ra)

In accordance with JIS B0601, using the high-precision surface roughness tester (SE-3FAT of Kosaka Kenkyusho Co. Ltd.), a chart is drawn under such conditions as a needle radius of 2 $\mu$m, a load of 30 mg, a magnification of 200,000× and a cut-off of 0.08 mm and a portion having a measurement length L in the direction of the center line is picked up from the surface roughness curve. The center line of this portion picked up is regarded as an X axis, the direction of the lengthwise magnification was regarded as a Y axis, and the roughness curve is expressed as Y=f(X). A value (Ra) given by the following equation is taken as the average surface roughness. This measurement is made four times with a reference length of 1.25 mm, and the average surface roughness is expressed by an average value of the measurement values.

$$Ra = \frac{1}{L}\int_0^L |f(x)| dx$$

(6) abrasion resistance

The surface is rubbed with steel wool #0000 and it is checked if the surface is scratched. If the surface is not scratched, its abrasion resistance is evaluated as good and if it is scratched, its abrasion resistance is evaluated as bad.

(7) reflectance

The ratio of the flux of reflected light to the flux of vertical incident light on the surface of the laminate is measured at a wavelength range of 400 to 570 nm, and an average value is taken as a reflectance.

EXAMPLE 1 AND COMPARATIVE EXAMPLE 1

Molten polyethylene terephthalate ([η]=0.65) was extruded from a die and cooled over a cooling drum by an usually employed method to obtain an unstretched film. Then, the unstretched film was stretched at a stretch ratio of 3.6 in the longitudinal direction and then coated uniformly with an 8 wt. % aqueous solution of the following coating composition on one side thereof with a roll coater. The composition of the aqueous polyester is expressed based on the whole acid component and the whole glycol component.

[coating composition]

copolyester comprising terephthalic acid (90 mol %), isophthalic acid (6 mol %), potassium 5-sulfoisophthalate (4 mol %), ethylene glycol (95 mol %), neopentyl glycol (5 mol %) (Tg=68° C.) ... 85 wt %

N,N'-ethylenebiscaprilic acid amide ... 5 wt % polyoxyethylene nonylphenyl ether ... 10 wt %

Thereafter, the coated film was dried at 95° C., stretched at a stretch ratio of 3.8 in the transverse direction at 120° C., and heat set at 220° C. to obtain a 40 μm-thick adherent film. The thickness of the coating layer was 0.15 μm (Example 1).

The haze value of this adherent polyester film laminate (A) was ○, the friction coefficient (μs) was evaluated as ○ and the adhesive force and blocking resistance were both evaluated as good.

On the other hand, for comparison, a coating composition containing no N,N'-ethylenebiscaprilic acid amide was used to form a film under the same conditions as above (Comparative Example 1).

The adhesive force of this film was evaluated to be 2 and the blocking resistance as ○. Therefore, this film was inferior in adhesive force.

EXAMPLES 2 TO 9 AND COMPARATIVE EXAMPLES 2 TO 4

Biaxially oriented films were obtained in the same manner as in Example 1 except that the composition of the coating compositions was changed as shown in Table 1.

The adhesive forces and anti-blocking properties of these films are shown in Table 1.

TABLE 1

| | Coating composition (wt. %) | | | | | |
|---|---|---|---|---|---|---|
| | Aqueous polyester *1) | Fatty acid amid or bisamide *2) | Fine particles *3) | Surfactant *4) | Adhesive force | Blocking resistance |
| Comp. Ex. 2 | T(80) | A(5) | G(10) | Y(5) | 2 | ○ |
| Ex. 2 | P(80) | A(5) | G(10) | Y(5) | 4 | ⊙ |
| Ex. 3 | Q(80) | A(5) | G(10) | Y(5) | 4 | ⊙ |
| Ex. 4 | P(80) | A(5) | G(10) | Y(5) | 5 | ⊙ |
| Comp. Ex. 3 | S(80) | A(5) | G(10) | Y(5) | 3 | Δ |
| Comp. Ex. 4 | R(85) | — | G(10) | Y(5) | 1 | Δ |
| Ex. 5 | R(80) | B(5) | G(10) | Y(5) | 5 | ⊙ |
| Ex. 6 | R(80) | C(5) | G(10) | Y(5) | 4 | ⊙ |
| Ex. 7 | R(80) | D(5) | G(10) | Y(5) | 4 | ⊙ |
| Ex. 8 | R(85) | A(3) | H(7) | Z(5) | 5 | ⊙ |
| Ex. 9 | R(80) | C(6) | G(9) | Y(5) | 5 | ⊙ |

Ex. = Example, Comp. Ex. = Comparative Example

Abbreviations used for coating compositions in the above table stand for the following compositions (to be applied to other subsequent tables).

*1) aqueous polyesters

P: copolyester comprising terephthalic acid (90 mol %), isophthalic acid (6 mol %), potassium 5-sulfoisophthalate (4 mol %), ethylene glycol (95 mol %) and neopentyl glycol (5 mol %) (Tg=68° C.)

Q: polyester comprising 2,6-naphthalenedicarboxylic acid (50 mol %), terephthalic acid (46 mol %), sodium 5-sulfoisophthalate (4 mol %), ethylene glycol (70 mol %), and addition product of bisphenol A with ethylene oxide (30 mol %) (Tg=80° C.)

R: copolyester comprising terephthalic acid (85 mol %), isophthalic acid (15 mol %), ethylene glycol (57 mol %), 1,4-butanediol (40 mol %), diethylene glycol (2 mol %), and polyethylene glycol (1 mol %) (Tg=47° C.)

S: polyester comprising terephthalic acid (70 mol %), isophthalic acid (28 mol %), sodium 5-sulfoisophthalate (2 mol %), ethylene glycol (70 mol %), and addition product of 1 molar bisphenol A with 4 molar ethylene oxide (30 mol %) (Tg=30° C.)

T: polyester comprising 2,6-naphthalenedicarboxylic acid (81 mol %), isophthalic acid (15 mol %), sodium 5-sulfoisophthalate (14 mol %), ethylene glycol (70 mol %), and addition product of 1 molar bisphenol A with 2 molar ethylene oxide (30 mol %) (Tg=90° C.)

*2) fatty acid amides and fatty acid bisamides

A: N,N'-methylenebisstearic acid amide

B: N,N'-ethylenebispalmitic acid amide

C: caprilic acid amide

D: stearic acid amide

E: N,N'-ethylenebiscaprilic acid amide

*3) fine particles

G: crosslinked acrylic resin fine particles (average particle diameter of 0.03 μm)

H: silica (average particle diameter of 0.12 μm)

*4) surfactants

Y: polyoxyethylene nonylphenyl ether

Z: polyoxyethylene-polyoxypropylene copolymer

As is apparent from Table 1, the polyester film laminates (A) of the present invention (Examples 2 to 9) exhibited excellent adhesive force and blocking resistance. However, when an aqueous polyester having a secondary transition point of higher than 85° C. was used (Comparative Example 2), the resulting film laminate was inferior in adhesive force and when an aqueous polyester having a secondary transition point of lower than 40° C. was used (Comparative Example 3), the resulting film laminate was unsatisfactory in terms of blocking resistance. When no fatty acid amide or bisamide was contained (Comparative Example 4), the resulting film laminate was inferior in adhesive force.

EXAMPLES 10 TO 13

Biaxially oriented films were obtained in the same manner as in Example 4 except that the amounts of the aqueous polyester contained in the coating composition and N,N'-methylenebisstearic acid amide were changed as shown in Table 3.

The results are shown in Table 2. When the amount of a fatty acid bisamide was 3 to 10% by weight (Examples 11 and 12), especially good results were obtained.

TABLE 2

| | Aqueous polyester (wt. %) | Fatty acid bisamide (wt. %) | Adhesive force | Blocking resistance |
|---|---|---|---|---|
| Example 10 | 83 | 2 | 4 | ○ |
| Example 11 | 82 | 3 | 5 | ⊚ |
| Example 12 | 76 | 9 | 5 | ⊚ |
| Example 13 | 74 | 13 | 4 | ○ |

EXAMPLE 14

Molten polyethylene-2,6-naphthalene dicarboxylate ([η]= 0.65) was extruded from a die and cooled over a cooling drum by an usually employed method to obtain an unstretched film. The unstretched film was stretched at a stretch ratio of 3.6 in the longitudinal direction and then coated uniformly with an 8 wt. % aqueous solution of the following coating composition on one side thereof with a roll coater.

Thereafter, the coated film was dried at 120° C., stretched at a stretch ratio of 3.8 in the transverse direction at 130° C., and heat set at 240° C. to obtain a 40 μm-thick adherent polyethylene-2,6-naphthalene dicarboxylate film. The thickness of the coating layer was 0.15 μm.

The haze value of this adherent film was evaluated as ○, the friction coefficient (μs) was evaluated as ○ and the adhesive force and blocking resistance were both evaluated as excellent.

[coating composition]
A: copolyester comprising terephthalic acid (90 mol %), isophthalic acid (6 mol %) and 5-potassium sulfoisophthalate (4 mol %) as acid components and ethylene glycol (95 mol %) and neopentyl glycol (5 mol %) as glycol components (Tg=68° C.) . . . 80 wt %
B: N,N'-ethylenebiscaprilic acid amide . . . 5 wt %
C: acrylic resin fine particles . . . 10 wt %
D: polyoxyethylene nonylphenyl ether . . . 5 wt %

COMPARATIVE EXAMPLE 5

A film was prepared under the same conditions as in Example 14 except that a coating composition containing no N,N'-ethylenebiscaprilic acid amide was used.

The adhesive force of this film was evaluated to be 2 and the blocking resistance was evaluated as ○. Therefore, this film was inferior in adhesive force.

EXAMPLE 15

Molten polyethylene terephthalate ([η]=0.65) was extruded from a die and cooled over a cooling drum by an usually employed method to obtain an unstretched film. The unstretched film was stretched at a stretch ratio of 3.6 in the longitudinal direction and then, coated uniformly with an 8 wt. % aqueous solution of the following coating composition on one side thereof with a roll coater.

[coating composition]
copolyester comprising terephthalic acid (90 mol %), isophthalic acid (6 mol %) and potassium 5-sulfoisophthalate (4 mol %) as acid components and ethylene glycol (95 mol %) and neopentyl glycol (5 mol %) as glycol components (Tg=68° C.) . . . 80 wt %
N,N'-ethylenebiscaprilic acid amide . . . 5 wt %
acrylic resin fine particles (average particle diameter of 0.03 μm) . . . 10 wt %
polyoxyethylene nonylphenyl ether . . . 5 wt %

Thereafter, the coated film was dried at 95° C., stretched at a stretch ratio of 3.8 in the transverse direction at 120° C., and heat set at 220° C. to obtain a 40 μm-thick adherent film. The thickness of the coating layer was 0.15 μm.

The haze value of this adherent polyester film laminate (A) was evaluated as ⊚, the slipperiness was evaluated as ○, center line average surface roughness (Ra) was 0.007 μm, and the blocking resistance was evaluated as ○.

Then, a hard coat layer composition having the following composition was applied uniformly to the coating layer so as to have a film thickness of 5 μm after curing using a roll coater, and cured by irradiation of an ultraviolet ray from a high-pressure mercury lamp having an intensity of 80 W/cm for 30 seconds to obtain a laminate (B) having a hard coat layer. This laminate (B) had an adhesive force evaluation value of the hard coat layer coated surface of 4 and was excellent in transparency and slipperiness and satisfactory in terms of blocking resistance.

[hard coat layer composition]

| pentaerythritol acrylate | 45 wt % |
|---|---|
| N-methylol acrylamide | 40 wt % |
| N-vinylpyrrolidone | 10 wt % |
| 1-hydroxycyclohexylphenyl ketone | 5 wt % |

COMPARATIVE EXAMPLE 6

A laminate film was prepared in the same conditions as in Example 15 except that a coating film composition containing no N,N'-ethylenebiscaprilic acid amide was used.

This laminate film was equivalent to the film of Example 15 in haze value, friction coefficient (μs), average surface roughness (Ra) and blocking resistance. However, the adhesive force of this film evaluated in the same manner as in Example 15 was 2. Therefore, the film is inferior in adhesive force to the film of Example 15.

EXAMPLES 16 TO 23

Adherent films were obtained in the same manner as in Example 15 except that the composition of the coating compositions was changed as shown in Table 3. The evaluation results of the adherent films are shown in Table 4.

Table 4 also include the evaluation results of Comparative Examples 1 to 4.

TABLE 3

| | Coating composition | | | | | | | | |
|---|---|---|---|---|---|---|---|---|---|
| | Aqueous polyester resin | | Fatty acid bisamide | | Fatty acid amide | | Fine particles | | Surfactant |
| | kind | (wt. %) | kind | (wt. %) | kind | (wt. %) | kind | (wt. %) | kind | (wt. %) |
| Ex. 15 | P | (80) | E | (5) | — | (—) | G | (10) | Y | (5) |
| Ex. 16 | P | (80) | A | (5) | — | (—) | G | (10) | Y | (5) |
| Ex. 17 | Q | (80) | A | (5) | — | (—) | G | (10) | Y | (5) |
| Ex. 18 | R | (80) | A | (5) | — | (—) | G | (10) | Y | (5) |
| Ex. 19 | R | (80) | B | (5) | — | (—) | G | (10) | Y | (5) |
| Ex. 20 | R | (80) | — | (—) | C | (5) | G | (10) | Y | (5) |
| Ex. 21 | R | (80) | — | (—) | D | (5) | G | (10) | Y | (5) |
| Ex. 22 | R | (83) | A | (5) | — | (—) | H | (7) | Z | (5) |
| Ex. 23 | R | (80) | A | (3) | C | (2) | G | (10) | Y | (5) |

TABLE 4

| | Haze value | Friction coefficient ($\mu$s) | Surface roughness (Ra) ($\mu$m) | Adhesive force | Blocking resistance |
|---|---|---|---|---|---|
| Ex. 15 | ⊚ | ○ | 0.007 | 4 | ○ |
| Ex. 16 | ⊚ | ○ | 0.010 | 4 | ⊚ |
| Ex. 17 | ⊚ | ○ | 0.006 | 4 | ⊚ |
| Ex. 18 | ⊚ | ○ | 0.007 | 5 | ⊚ |
| Ex. 19 | ⊚ | ○ | 0.006 | 5 | ⊚ |
| Ex. 20 | ⊚ | ○ | 0.007 | 4 | ⊚ |
| Ex. 21 | ⊚ | ○ | 0.007 | 4 | ⊚ |
| Ex. 22 | ⊚ | ○ | 0.007 | 5 | ⊚ |
| Ex. 23 | ⊚ | ○ | 0.006 | 5 | ⊚ |
| Comp. Ex. 1 | ⊚ | ○ | 0.007 | 2 | ○ |
| Comp. Ex. 2 | ○ | ○ | 0.010 | 2 | ○ |
| Comp. Ex. 3 | ⊚ | ○ | 0.006 | 3 | Δ |
| Comp. Ex. 4 | ⊚ | ○ | 0.007 | 1 | Δ |

As is evident from the results shown in Table 4, the film laminates (A) of the present invention (Examples 15 to 23) were excellent in transparency, slipperiness, adhesive force and blocking resistance. However, when an aqueous polyester having a secondary transition point of higher than 85° C. was used (Comparative Example 2), the resulting laminate was inferior in adhesive force and when an aqueous polyester having a secondary transition point of lower than 40° C. was used (Comparative Example 3), blocking resistance was insufficient. When fatty acid amide or fatty acid bisamide was not contained (Comparative Example 4), the resulting laminate was inferior in adhesive force.

EXAMPLES 24 TO 27

Adherent films were obtained in the same manner as in Example 18 except that the amount of N,N'-methylenebisstearic acid amide as a component of the coating composition was changed as shown in Table 5 and the proportion of the aqueous polyester was reduced to ensure that the total amounts of the components contained in the composition came to 100%. The evaluation results of the films are shown in Table 5. When the proportion of a fatty acid bisamide was 3 to 10% by weight (Examples 25 and 26), particularly excellent adhesive force and blocking resistance were obtained.

TABLE 5

| | Amount of fatty acid bisamide (wt. %) | Haze value | Friction coefficient ($\mu$s) | Surface roughness (Ra) ($\mu$m) | Adhesive force | Blocking resistance |
|---|---|---|---|---|---|---|
| Ex. 24 | 2 | ⊚ | ○ | 0.005 | 4 | ○ |
| Ex. 25 | 3 | ⊚ | ○ | 0.006 | 5 | ⊚ |
| Ex. 26 | 9 | ⊚ | ○ | 0.007 | 5 | ⊚ |
| Ex. 27 | 11 | ⊚ | ○ | 0.010 | 4 | ○ |

EXAMPLES 28 TO 33 AND COMPARATIVE EXAMPLES 7 TO 10

Adherent films having different haze values and friction coefficients ($\mu$s) (surface roughness) were obtained in the same manner as in Example 18 except that type and amount of the fine particles added were changed as shown in Table 6 and the proportion of the aqueous polyester was reduced to ensure the proportions of the components contained in the composition totaled 100%. The evaluation results of the films are shown in Table 6. Films having a haze value of more than 1 (Comparative Examples 8 and 10) were inferior in transparency and not suitable for use as a surface protective material which is required to be transparent. Films having a friction coefficient ($\mu$s) of more than 0.8 (Comparative Examples 7 and 9) were inferior in slipperiness and unsatisfactory in terms of wind-up, handling and anti-blocking properties. In contrast to this, the adherent film laminates (A) of the present invention having a haze value of not more than 1% and a friction coefficient ($\mu$s) of not more than 0.8 (Examples 28 to 33) exhibited good transparency and slipperiness.

TABLE 6

| | Fine particles type | Fine particles (wt. %) | Haze value | Friction coefficient (μs) | Surface roughness (Ra) (μm) | Adhesive force | Blocking resistance |
|---|---|---|---|---|---|---|---|
| Ex. 28 | G | ( 8) | ◎ | ○ | 0.007 | 5 | ○ |
| Ex. 29 | G | (15) | ◎ | ◎ | 0.009 | 5 | ◎ |
| Ex. 30 | G | (30) | ○ | ◎ | 0.010 | 5 | ◎ |
| Ex. 31 | H | ( 5) | ◎ | ○ | 0.007 | 5 | ○ |
| Ex. 32 | H | ( 7) | ◎ | ◎ | 0.008 | 5 | ◎ |
| Ex. 33 | H | (10) | ○ | ◎ | 0.010 | 5 | ◎ |
| Comp. Ex. 7 | G | ( 5) | ◎ | X | 0.004 | 5 | Δ |
| Comp. Ex. 8 | G | (32) | X | ◎ | 0.016 | 5 | ◎ |
| Comp. Ex. 9 | H | ( 3) | ◎ | X | 0.004 | 5 | Δ |
| Comp. Ex. 10 | H | (12) | X | ◎ | 0.012 | 5 | ◎ |

EXAMPLE 34

An UV cured resin composition having the following composition was applied uniformly to the adherent coating film of the adherent film obtained in Example 19 to a film thickness of 6 μm after curing, using a roll coater.

[UV curable resin composition]

| | |
|---|---|
| pentaerythritol acrylate | 20 wt % |
| N-methylol acrylamide | 40 wt % |
| trimethylolpropane triacrylate | 25 wt % |
| N-vinylpyrrolidone | 10 wt % |
| P-phenoxydichloroacetophenone | 5 wt % |

Thereafter, the film was cured by irradiation of an ultraviolet ray from a high-pressure mercury lamp having an intensity of 80 W/cm for 30 seconds to form a hard coat layer to obtain a laminate (B).

In this laminate (B), the hard coat layer was strongly adhered to the polyester film and the adhesive force was evaluated to be 4. This laminate (B) had a high surface hardness, was excellent in abrasion resistance and was extremely useful as a surface protective material which is required to be transparent.

EXAMPLE 35

Molten polyethylene terephthalate ([η]=0.65) was extruded from a die and cooled over a cooling drum by an usually employed method to obtain an unstretched film. The unstretched film was stretched at a stretch ratio of 3.6 in the longitudinal direction and then, coated uniformly with an 8 wt. % aqueous solution of the following coating composition on one side thereof with a roll coater.

[coating composition]
 copolyester comprising terephthalic acid (90 mol %), isophthalic acid (6 mol %) and 5-potassium sulfoisophthalate (4 mol %) as acid components and ethylene glycol (95 mol %) and neopentyl glycol (5 mo %) as glycol components (Tg=68° C.) . . . 80 wt %
 N,N'-ethylenebiscaprilic acid amide . . . 5 wt %
 acrylic resin fine particles (average particle diameter of 0.03 μm) . . . 10 wt % polyoxyethylene nonylphenyl ether . . . 5 wt %

Thereafter, the coated film was dried at 950° C., stretched at a stretch ratio of 3.8 in the transverse direction at 120° C., and heat set at 220° C. to obtain a 40 μm-thick adherent film. The thickness of the coating layer was 0.15 μm.

Subsequently, an UV cured resin composition having the following composition was applied uniformly to the coating film to a film thickness of 5 μm after curing, using a roll coater.

[UV curable resin composition]
 pentaerythritol acrylate . . . 45 wt %
 N-methylol acrylamide . . . 40 wt %
 N-vinylpyrrolidone . . . 10 wt %
 1-hydroxycyclohexylphenyl ketone . . . 5 wt %

Thereafter, the coated film was cured by irradiation of an ultraviolet ray from a high-pressure mercury lamp having an intensity of 80 W/cm for 30 seconds to form a hard coat layer. The adhesive force at this point was evaluated to be 4.

On this hard coat layer were formed a low-refractive index layer ($SiO_2$, 30 nm), a high-refractive index layer ($TiO_2$, 30 nm), a low-refractive index layer ($SiO_2$, 30 nm), a high-refractive index layer ($TiO_2$, 100 nm) and a low-refractive index layer ($SiO_2$, 100 nm) by sputtering, in the order named.

The thus obtained laminate (C) had a haze evaluation of ◎, little reflection with a refractive index of 0.7% and such excellent abrasion resistance that it was not scratched by rubbing strongly with steel wool.

COMPARATIVE EXAMPLE 11

A laminate was prepared under the same conditions as in Example 35 except that a coating composition containing no N,N'-ethylenebiscaprilic acid amide was used. The evaluation results of this laminate are shown in Table 8. This laminate was equivalent to the laminate of Example 35 in haze value, abrasion resistance and reflectance but inferior in adhesive force at 2 when evaluated in the same manner as in Example 35.

EXAMPLES 36 TO 43 AND COMPARATIVE EXAMPLE 12 AND 13

Laminates (C) were obtained in the same manner as in Example 35 except that the composition of the coating compositions was changed as shown in Table 7. The evaluation results of the laminates (C) are shown in Table 8.

TABLE 7

| | Coating composition (wt. %) | | | |
|---|---|---|---|---|
| | Aqueous polyester | Fatty acid amid or bisamide | Fine particles | Surfactant |
| Comp. Ex. 11 | T(80) | A(5) | G(10) | Y(5) |
| Ex. 36 | P(80) | A(5) | G(10) | Y(5) |
| Ex. 37 | Q(80) | A(5) | G(10) | Y(5) |

TABLE 7-continued

| | Coating composition (wt. %) | | | |
|---|---|---|---|---|
| | Aqueous polyester | Fatty acid amid or bisamide | Fine particles | Surfactant |
| Ex. 38 | R(80) | A(5) | G(10) | Y(5) |
| Comp. Ex. 12 | S(80) | A(5) | G(10) | Y(5) |
| Comp. Ex. 13 | R(85) | — | G(10) | Y(5) |
| Ex. 39 | R(80) | B(5) | G(10) | Y(5) |
| Ex. 40 | R(80) | C(5) | G(10) | Y(5) |
| Ex. 41 | R(80) | D(5) | G(10) | Y(5) |
| Ex. 42 | R(83) | A(5) | H(7) | Z(5) |
| Ex. 43 | R(80) | A(3),C(2) | G(10) | Y(5) |

TABLE 8

| | Haze value | Adhesive force | Wear resistance | Reflectance |
|---|---|---|---|---|
| Comp. Ex. 11 | ◉ | 2 | Good | 0.7 |
| Ex. 36 | ◉ | 4 | Good | 0.7 |
| Ex. 37 | ◉ | 4 | Good | 0.7 |
| Ex. 38 | ◉ | 5 | Good | 0.7 |
| Comp. Ex. 12 | ◉ | 3 | Good | 0.7 |
| Comp. Ex. 13 | ◉ | 1 | Good | 0.7 |
| Ex. 39 | ◉ | 5 | Good | 0.7 |
| Ex. 40 | ◉ | 4 | Good | 0.7 |
| Ex. 41 | ◉ | 4 | Good | 0.7 |
| Ex. 42 | ◉ | 5 | Good | 0.7 |
| Ex. 43 | ◉ | 5 | Good | 0.7 |

As is apparent from the results of Example 35 and the results shown in Table 8, the laminates of the present invention (Examples 35 to 43) were excellent in transparency, adhesive force, abrasion resistance and anti-reflection property. However, when an aqueous polyester having a secondary transition point of higher than 85° C. was used (Comparative Example 11), the resulting laminate was inferior in adhesive force and when an aqueous polyester having a secondary transition point of lower than 40° C. was used (Comparative Example 12), the adhesive force was insufficient and the blocking resistance of the film before the formation of a hard coat layer was insufficient. When fatty acid amide or fatty acid bisamide was not contained (Comparative Example 13), the resulting film was inferior in adhesive force.

EXAMPLES 44 TO 47

Laminates were obtained in the same manner as in Example 38 except that the amount of N,N'-methylenebisstearic acid amide as a component of the coating composition was changed as shown in Table 9. The results are shown in Table 9. When the proportion of a fatty acid bisamide was 3 to 10% by weight (Examples 45 and 46), excellent adhesive force was obtained.

TABLE 9

| | Amount of fatty acid bisamide (wt. %) | Haze value | Adhesive force | Wear resistance | Reflectance (%) |
|---|---|---|---|---|---|
| Ex. 44 | 2 | ◉ | 4 | Good | 0.7 |
| Ex. 45 | 3 | ◉ | 5 | Good | 0.7 |
| Ex. 46 | 9 | ◉ | 5 | Good | 0.7 |
| Ex. 47 | 11 | ◉ | 4 | Good | 0.7 |

EXAMPLES 48 TO 51 AND COMPARATIVE EXAMPLES 14 AND 15

Film laminates (C) having different haze values were obtained as in the same manner as in Example 38 except that kind and amount of the fine particles added were changed as shown in Table 10. The results are shown in Table 10. Laminates having a haze value of more than 1% (Comparative Example 14 and 15) were inferior in transparency and not suitable as a surface protective material which is required to be transparent. In contrast, laminates having a haze value of not more than 1% of the present invention (Examples 48 to 51) exhibited excellent transparency and slipperiness.

TABLE 10

| | Fine particles | Amount (wt. %) | Haze value | Adhesive force | Wear resistance | Reflectance (%) |
|---|---|---|---|---|---|---|
| Ex. 48 | G | 15 | ◉ | 5 | Good | 0.7 |
| Ex. 49 | G | 30 | ○ | 5 | Good | 0.7 |
| Comp. Ex. 14 | G | 32 | X | 5 | Good | 0.4 |
| Ex. 50 | H | 7 | ◉ | 5 | Good | 0.7 |
| Ex. 51 | H | 10 | ○ | 5 | Good | 0.7 |
| Comp. Ex. 15 | H | 12 | X | 5 | Good | 0.5 |

Ex.: Example; Comp. Ex.: Comparative Example

EXAMPLE 52

An UV curable resin composition having the following composition was applied uniformly to the coating film of the adherent polyester film laminate (A) obtained in Example 39 to a film thickness of 5 μm after curing, using a roll coater.
[UV curable resin composition]
 pentaerythritol acrylate . . . 20 wt %
 N-methylol acrylamide . . . 40 wt %
 trimethylolpropane triacrylate . . 25 wt %
 N-vinylpyrrolidone . . . 10 wt %
 p-phenoxydichloroacetophenone . . . 5 wt %
Thereafter, the coated film was cured by irradiation of an ultraviolet ray from a high-pressure mercury lamp having an intensity of 80 W/cm for 30 seconds to form a hard coat layer. The adhesive force at this point was evaluated to be 4.

On this hard coat layer were formed a high-refractive index layer (ITO, 20 nm), a low-refractive index layer (AlSiO, 20 nm), a high-refractive index layer (ITO, 80 nm) and a low-refractive index layer (AlSiO, 88 nm) by sputtering in the order named. The thus obtained laminate (C) had a haze evaluation of ◉, little reflection at a reflectance of 0.7% and excellent abrasion resistance.

[Effect of the Invention]

According to the present invention, there can be provided a polyester film laminate (A) which is excellent in adhesion to other layers to be laminated, metals and glass, transparency and slipperiness, particularly an adherent polyester film laminate (A) which is suitable for use as a surface protective material for windowpanes, showcases, spectacles, meters, displays, lamps and the like, and further a laminate [B] which has a hard coat layer formed on the adherent layer of the above adherent polyester film, and improved surface hardness and abrasion resistance.

According to the present invention, there can be further provided a polyester film laminate (C) which has excellent adhesive force, good surface hardness and abrasion resistance, and sufficient transparency and anti-reflection property.

What is claimed is:

1. An adherent polyester film laminate (A) having a coating layer of a composition formed on one side or both sides of a polyester film, the composition comprising, as main components,
   (i) an aqueous polyester having a secondary transition point of 40 to 85° C. and
   (ii) an amount of a fatty acid bisamide effective to improve at least one property of the coated laminate selected from the group consisting of adhesion, transparency, slipperiness, surface hardness, abrasion resistance and anti-reflection.

2. A polyester film laminate (A) having a haze value of not more than 1.5% and a friction coefficient (μs) of not more than 0.8 and a coating layer of a composition formed on one side or both sides of a polyester film, the composition comprising, as main components,
   (i) an aqueous polyester having a secondary transition point of 40 to 85° C. and
   (ii) an amount of a fatty acid bisamide effective to improve at least one property of the coated laminate selected from the group consisting of adhesion, transparency, slipperiness, surface hardness, abrasion resistance and anti-reflection.

3. The polyester film laminate (A) of claim 1 or 2, wherein the content of the fatty acid bisamide (ii) in the composition is 2 to 10% by weight.

4. The polyester film laminate (A) of claim 1 or 2, wherein the composition comprises, as main components, (i) the aqueous polyester and (ii) a fatty acid bisamide represented by the following general formula:

$$R^1CONHR^3NHOCR^2$$

wherein $R^1$ and $R^2$ are independently a monovalent aliphatic group having 6 to 22 carbon atoms, and $R^3$ is a divalent aliphatic group having 1 to 2 carbon atoms.

5. The polyester film laminate (A) of claim 1 or 2, wherein the composition further contains 5 to 30% by weight of fine particles having an average particle diameter of not more than 0.15 μm.

6. The polyester film laminate (A) of claim 1 or 2, wherein the thickness of the polyester film is 25 to 200 μm and the thickness of the coating layer is 0.01 to 0.2 μm.

7. A polyester film laminate (B) having a hard coat layer formed on the coating layer of the polyester film laminate (A) of claim 1 or 2.

8. The polyester film laminate (B) according to claim 7, wherein the hard coat layer is formed of a radiation cured resin.

9. The polyester film laminate (B) according to claim 7, wherein the thickness of the hard coat layer is 3 to 30 μm.

10. A polyester film laminate (C) having a hard coat layer and an anti-reflection layer formed on the coating layer of the polyester film laminate (A) of claim 1 or 2 in the order named.

11. The polyester film laminate (C) of claim 10, wherein the hard coat layer is formed of a radiation cured resin.

12. The polyester film laminate (C) of claim 10, wherein the thickness of the hard coat layer is 3 to 30 μm and the thickness of the anti-reflection layer is 0.05 to 0.5 μm.

13. A cathode ray tube of which the face surface is covered with the polyester film laminate (C) of claim 10.

14. A method of protecting a surface of a cathode ray tube by covering the surface with the polyester film laminate (C) of claim 10.

* * * * *